(12) United States Patent
Youngner et al.

(10) Patent No.: US 8,928,880 B2
(45) Date of Patent: *Jan. 6, 2015

(54) TUNED DYNAMIC EIGEN SPECTROSCOPY SYSTEMS

(75) Inventors: Daniel Youngner, Maple Grove, MN (US); Yue Liu, Wayzata, MN (US); Lisa Lust, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/560,220

(22) Filed: Jul. 27, 2012

(65) Prior Publication Data

US 2013/0027700 A1  Jan. 31, 2013

Related U.S. Application Data

(60) Provisional application No. 61/512,638, filed on Jul. 28, 2011.

(51) Int. Cl.
*G01J 3/04* (2006.01)
*G01J 3/28* (2006.01)
*G01J 3/457* (2006.01)
*G01J 3/02* (2006.01)
*G01J 3/18* (2006.01)
*G01J 3/14* (2006.01)

(52) U.S. Cl.
CPC .............. *G01J 3/0237* (2013.01); *G01J 3/2803* (2013.01); *G01J 3/457* (2013.01); *G01J 3/0229* (2013.01); *G01J 3/0208* (2013.01); *G01J 3/1804* (2013.01); *G01J 3/14* (2013.01)
USPC ........................................... 356/310

(58) Field of Classification Search
CPC .............. F24J 2/04; F24J 2/46; G01J 3/0208; G01J 3/0229; G01J 3/0237; G01J 3/14; G01J 3/1804; G01J 3/2803; G01J 3/457; Y02E 10/44; G01N 21/3504; G01N 3/457; G01N 3/453; G01N 3/0229; G01N 3/0208; G01N 3/0237; G01N 3/14; G01N 3/1804; G01N 3/2803
USPC ............ 356/310, 401, 446; 359/199.1, 224.1, 359/290, 572, 566; 250/372, 373, 338.5, 250/343, 345
See application file for complete search history.

(56) References Cited

U.S. PATENT DOCUMENTS 3,955,891 A * 5/1976 Knight et al. ................. 356/310
4,843,084 A   6/1989 Parker et al.

(Continued)

OTHER PUBLICATIONS

Chuanwei Wang, Hung-Hsiu Yu, Mingching Wu, Weileun Fang, "Implementation of phase-locked loop control for MEMS scanning mirror using DSP," Sensors and Actuators A 133 (2007) 243-249.*

*Primary Examiner* — Kara E Geisel
*Assistant Examiner* — Violeta A Prieto
(74) *Attorney, Agent, or Firm* — Schwegman Lundberg & Woessner, P.A.

(57) ABSTRACT

An apparatus for detecting gas concentrations includes a coded filter to oscillate proximate a resonant frequency. A photo detector is positioned below the coded filter such that the coded filter selectively blocks light that is directed at the photo detector. Optics are positioned to project spectral information on to the coded filter. A processor analyzes a signal received from the photo detector. The processor is adapted to weight a harmonic attic signal.

19 Claims, 7 Drawing Sheets

(56) References Cited

U.S. PATENT DOCUMENTS

| | | | | |
|---|---|---|---|---|
| 4,884,214 A | | 11/1989 | Parker et al. | |
| 4,997,272 A | * | 3/1991 | Dopheide et al. | 356/28.5 |
| 5,181,653 A | | 1/1993 | Foster et al. | |
| 5,283,625 A | * | 2/1994 | Bunn, Jr. | 356/463 |
| 5,311,451 A | | 5/1994 | Barrett | |
| 5,682,949 A | | 11/1997 | Ratcliffe et al. | |
| 5,815,261 A | * | 9/1998 | Brooks et al. | 356/310 |
| 5,905,571 A | * | 5/1999 | Butler et al. | 356/328 |
| 5,927,398 A | | 7/1999 | Maciulewicz | |
| 5,934,554 A | | 8/1999 | Charles et al. | |
| 6,157,943 A | | 12/2000 | Meyer | |
| 6,192,282 B1 | | 2/2001 | Smith et al. | |
| 6,196,467 B1 | | 3/2001 | Dushane et al. | |
| 6,356,350 B1 | * | 3/2002 | Silver et al. | 356/437 |
| 6,688,159 B1 | * | 2/2004 | Grunewald | 73/25.03 |
| 6,872,947 B1 | * | 3/2005 | Greywall | 250/339.13 |
| 7,420,673 B2 | * | 9/2008 | Hagler | 356/310 |
| 7,561,317 B2 | * | 7/2009 | Weir | 359/201.1 |
| 7,948,668 B2 | * | 5/2011 | Rothaar | 359/224.1 |
| 2004/0252667 A1 | * | 12/2004 | Dent | 370/335 |
| 2005/0061969 A1 | * | 3/2005 | Greywall | 250/300 |
| 2008/0100836 A1 | * | 5/2008 | Hagler | 356/310 |
| 2010/0073748 A1 | * | 3/2010 | Holmes et al. | 359/199.1 |
| 2010/0079836 A1 | * | 4/2010 | Rothaar | 359/223.1 |
| 2013/0027700 A1 | * | 1/2013 | Youngner et al. | 356/310 |

* cited by examiner

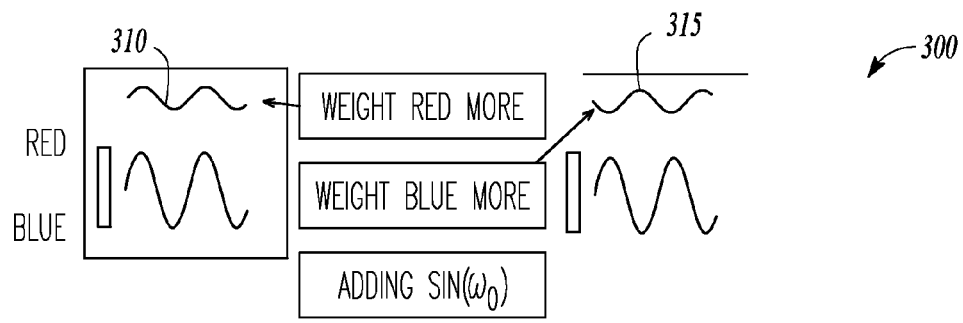
WEIGHT THE RED-SHIFTED PARTS DIFFERENTLY THAN THE BLUE-SHIFTED PARTS
*Fig. 3*
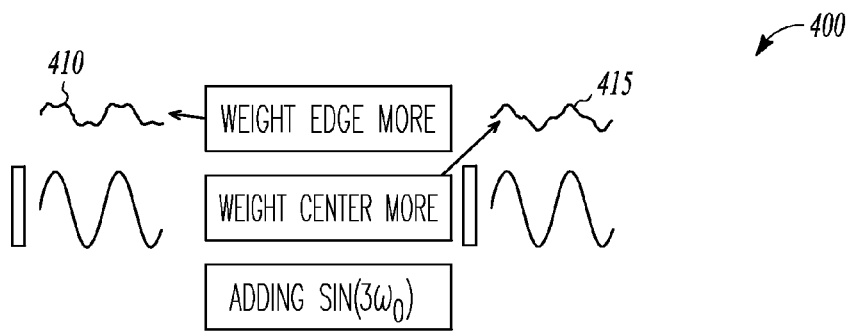
RED-SHIFT, & WEIGHT THE OUTER EDGES OF EACH SLIT DIFFERENTLY FROM THE CENTER
*Fig. 4*
$$W = \sum_{n=0}^{n_{MAX}} k_n \sin(n\omega_0)$$
*Fig. 5*

US 8,928,880 B2

TUNED DYNAMIC EIGEN SPECTROSCOPY SYSTEMS

RELATED APPLICATION

This application claims priority to U.S. Provisional Application Ser. No. 61/512,638 (entitled ELECTRONIC FINE-TUNING OF DES SYSTEMS, filed Jul. 28, 2011) which is incorporated herein by reference in its entirety.

TECHNICAL FIELD

The present invention relates to detecting natural gas concentrations and in particular detecting natural gas concentration using Dynamic Eigen Spectroscopy.

BACKGROUND

Monitoring the atmospheric gasses in and around an oil refinery may be performed to determine whether hydrogen sulfide is present, and to qualify its concentration if it is detected. Monitoring a gas cloud heading toward an Army base may be useful to determine whether that cloud contains chemical warfare agents. Existing techniques, including TDLS (Tunable Diode Laser Spectroscopy), NDIR (Non-Dispersive InfraRed analysis), Polychromatry, and FTIR (Fourier Transform InfraRed analysis) all have limitations that, depending on the application, can limit their ability to detect atmospheric gasses at the desired level.

Identifying unknown chemical contaminant in the atmosphere from afar can be very difficult because normal components of the atmosphere such as H2O and CO2 (water vapor and carbon dioxide) have spectral signatures that are similar to, and overlap with the spectral signature of many of the contaminants of interest.

Existing Dynamic Eigen Spectroscopy can be designed to have superb chemical specificity, i.e., they can be designed to be very sensitive to the emission or absorption of one specific chemical or group of chemicals while being very insensitive to other chemicals or groups of chemical. Unfortunately, when such systems are manufactured they might not perform as well as modeled.

SUMMARY

An apparatus for detecting gas concentrations includes a coded filter to oscillate proximate a resonant frequency. A photo detector is positioned below the coded filter such that the coded filter selectively blocks light that is directed at the photo detector. Optics are positioned to project spectral information on to the coded filter. A processor analyzes a signal received from the photo detector. The processor is adapted to weight a harmonic of the signal.

In a further embodiment, a device for detecting gas concentrations includes a movable coded filter having multiple slits in a proof mass. An optical element is positioned to receive gas filtered light and spectrally separate the gas filtered light onto the coded filter wherein spectral bands run in the same direction as the slits, the slits positioned to cancel AC signals corresponding to at least one gas not of interest. A photo detector is positioned to receive the spectrally separated light through the oscillating slits in the moveable coded filter to provide an AC signal representative of a selected gas. A controller is coupled to receive the AC signal, convert the AC signal to a digital signal, to weight a harmonic of the received AC signal, and to correlate an amplitude of the AC signal with the weighted harmonic to a concentration of the selected gas.

A method fir detecting a gas includes receiving light from a light source through a plume of gas, spectrally separating the light, oscillating a coded filter to selectively pass portions of the spectrally separated light onto a single photo detector, detecting an AC signal via the single photo detector representative of a gas of interest, weighting a harmonic of the AC signal, and combining the AC signal with the weighted harmonic of the AC signal to detect the gas.

BRIEF DESCRIPTION OF THE DRAWINGS

FIG. 3 is a diagram illustrating weighted harmonics to account for coded filter misalignment according to an example embodiment.

FIG. 4 is a diagram illustrated weighted harmonics to account for slit width error in the coded filter according to an example embodiment.

FIG. 5 is a diagram illustrating a technique for adding weighted harmonics for signal analysis to identify gases according to an example embodiment.

DETAILED DESCRIPTION

Figure 1:
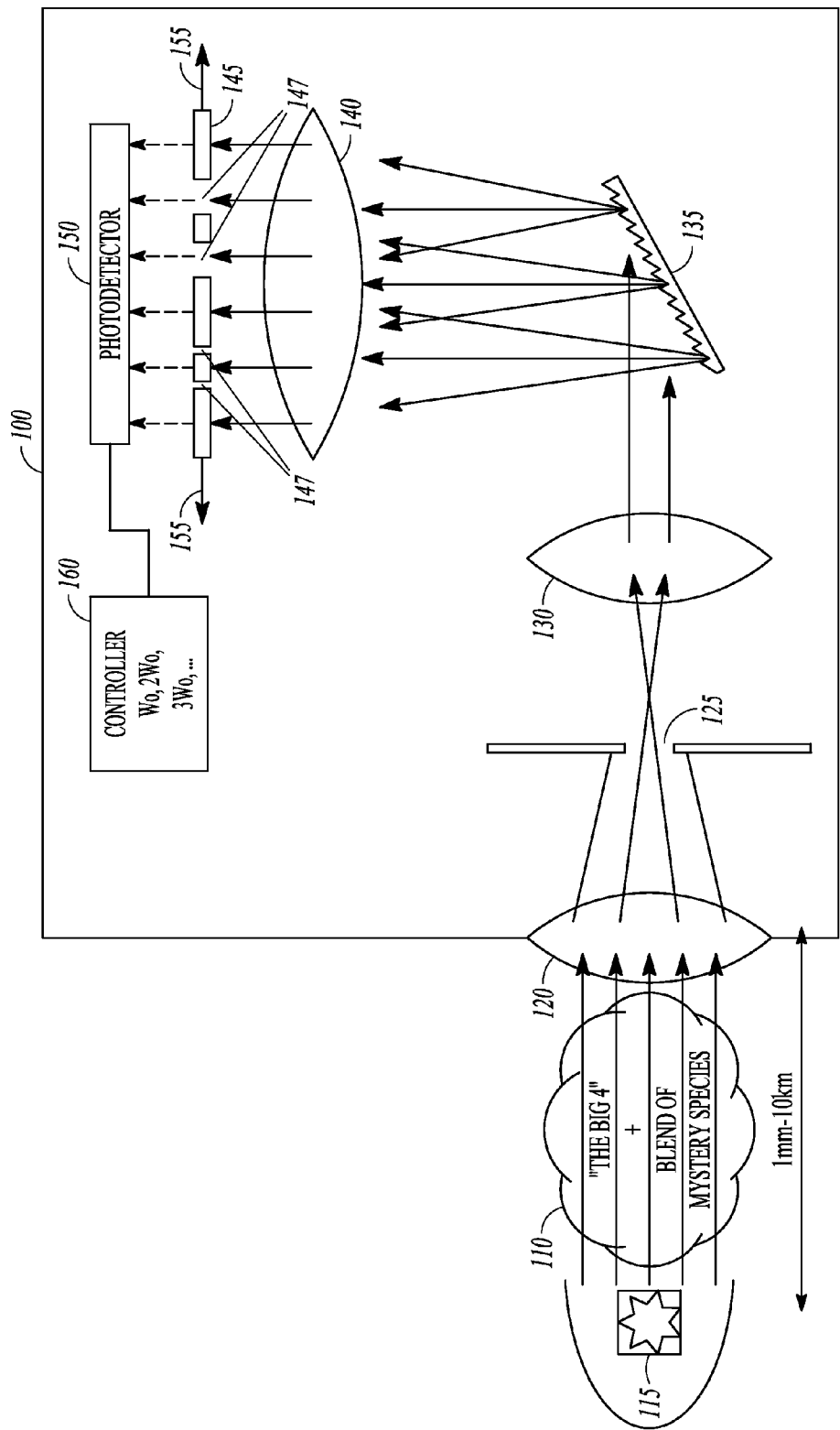
FIG. 1 is a block diagram of a device for detecting gas according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A device receives light from a source of light after the light has passed through a gas. The gas absorbs some of the light depending on the constituents of the gas. Each gas has its own unique absorption spectra. The light reaching the device has its spectra spread out by wavelength using an optical element, such as a prism or diffraction grating. The optical element spectrally separates incoming light so that shorter wavelengths are directed in one direction and longer wavelengths are directed in a second direction. An opaque filter with slits is then oscillated at a selected frequency, with the slits moving between different frequencies or wavelengths of the spread spectra.

A photo detector is positioned to receive the light passed by the slits in the filter to measure power of the total amount of light passed. The slits are designed and positioned to pass offsetting AC components of the spectrally separated light passed by at least one not of interest gas, while allowing at least one AC component of the spectrally separated light from a selected gas to be received by the photo detector. In other words, the spectra is dynamically changed in such a way that the contribution to the total (dynamic) signal from the particular spectral components of interest also change dynamically, but the contribution to the (dynamic) signal from the not-of-interest species does not change. In this manner, the signal at the detector is orthogonal to interferrents.

The photo detector is responsive to the AC component or components of the selected gas to indicate the presence of the selected gas. The amplitude of an AC signal provided by the photo detector will be proportional to the amount of the selected gas that the light has passed through. This process may be referred to as DES (Dynamic Eigen Spectroscopy) due to the enhancement of the AC signal of the gas of interest while AC signals of gases not of interest cancel each other.

In some embodiments, multiple slits are utilized to cancel AC components from more than one gas, while allowing an AC component from a selected gas to be detected by the photo detector. The filter may include multiple lanes with different sets of slits to detect different gases. Each lane will also be associated with a different photo detector.

To offset errors in the signal introduced by various deviations from nominal design of the system, one or more harmonics of the AC signals are weighted and combined with the original AC signals. In some embodiments, one of the harmonics includes the phase of the original AC signal. In further embodiments, the phase and amplitude of higher order harmonic signals may be weighted and combined to offset different deviations from nominal, such as misalignment of the slits, a slit width error, errors due to alignment of slits and slit width error based on radius of curvature of species, deviations of the response the photo detector to different wavelengths of light, and variations in the expected absorption spectra of different species. Second, third, and fourth order harmonics may be weighted in some embodiments. Higher order harmonics may be weighted in still further embodiments.

When the spectra is separated by wavelength and collimated by using real diffraction gratings, prisms, and/or other optical elements, the spectra that reaches the coded filter will often be smeared relative to the spectra that arrives at the detector. This smear will often have a Gaussian shape, but may include linear and/or other components depending on the details of the optical elements, the separation of the optical elements, and the rotation of the slits relative to separation-axis of the spectrally-separated light. While the coded filter may be designed to take some spectral smear into account, signal processing of one or more weighted harmonics may be used to account for deviations of components from nominal, and other variations that may occur from a nominal design.

In one embodiment, a set of many (e.g. 25) different coded filters, each of which is orthogonal to a known set of spectra (e.g. the spectra of water vapor, carbon dioxide, methane, and ozone) to cancel out signals from such gases. Each of these ~25 coded filters may be orthogonal and different from one another in a unique way. Each uses different portions of the spectrum to provide orthogonality. When the AC signal is measured from several of the coded filters, it becomes possible to determine the composition and the quantities of several of the chemicals that are in the atmosphere.

A schematic diagram of a system 100 for detecting gas is shown in FIG. 1. A gas 110 may contain many different gasses that absorb light from a source of light 115. The light source may be a blackbody that emits a spectrally broad source of light. Examples include background terrain that reflects sunlight, or an actual active source, such as a light emitting diode or other artificial source of light. Each different type of gas absorbs different wavelengths of light, while allowing other wavelengths to pass. The gas may operate as a sort of filter. The passed light is received by the system 100 via a lens 120 that directs the light toward a slit 125.

Light that proceeds through the slit is collimated by a lens 130 and then spectrally separated by an optical element 135, such as a prism or diffraction grating. The spectrally separated light is then collimated again via a lens 140 and directed toward a coded filter 145. The coded fitter is opaque with multiple slits 147 positioned to allow different wavelengths of the spectrally separated light to pass to a photo detector 150. The slits are oriented parallel to the spectral lines and each extends a selected width of the spectra. The coded filter is oscillated transverse 155 to the spectrally separated light such that AC components of the spectrally separated light are incident on the photo detector 150. A controller 160 is coupled to the photo detector to receive a signal representative of the amplitude of the light incident on the photo detector 150. The controller may include an analog amplifier, an analog to digital converter, optional digital weighting functions, and a processor to process the digital signals derived from the photo detector 150 signal. In various embodiments, the controller may integrate the AC signals over a time period that may vary from 0.1 seconds giving a signal to noise ratio of approximately 3:1, to 10 seconds, providing a signal to noise ratio of approximately 30:1. The integration times and signal to noise ratios may vary significantly from embodiment to embodiment, with neither quoted times and ratios being limits.

The controller 160 also utilizes weighted harmonics of the photodetector generated signal to account for deviations of the components and expected absorption spectra. The signal itself is referred to as a first harmonic. The phase of the first harmonic may be weighted in one embodiment. In further embodiments, the amplitude and phase of higher order harmonics may be weighted to account for a broad array of factors that may affect the accuracy and sensitivity of the system 100.

In one embodiment, the coded filter is oscillated at a frequency $\omega_0$, and light is also sensed at $\omega_0$. Controller 160 is adapted via programming or circuitry or a combination of both to assign weighting terms to the harmonic components of the optical signal at the photodectector, and add one or more components to a function that utilizes the sensed signal at $\omega_0$. Various harmonic components may be included in different embodiments.

By adding higher harmonic $k_n \sin(n\omega_0)$ terms to the weighting function it becomes possible to deal with variabilities in the absorption spectra in the different chemicals. The Absorption function $A_{CS}$ for the $C^{th}$ chemical and the $s^{th}$ slit can be expressed as its Taylor function expansion around the mid-point of the slit: $A_{CS}=a_{0cs}+a_{1cs}x(t)+a_{2cs}x^2(t)+a_{3cs}x^3(t)+a_{4cs}x^4(t)+a_{5cs}x^5(t)+a_{6cs}x^6(t)+a_{7cs}x^7(t)$. Here, $x(t)$ = Amplitude*$\sin(\omega_0 t)$. The weighting function brings in tremendous flexibility in provide orthogonality, despite processing and packaging variabilities.

Figure 2:
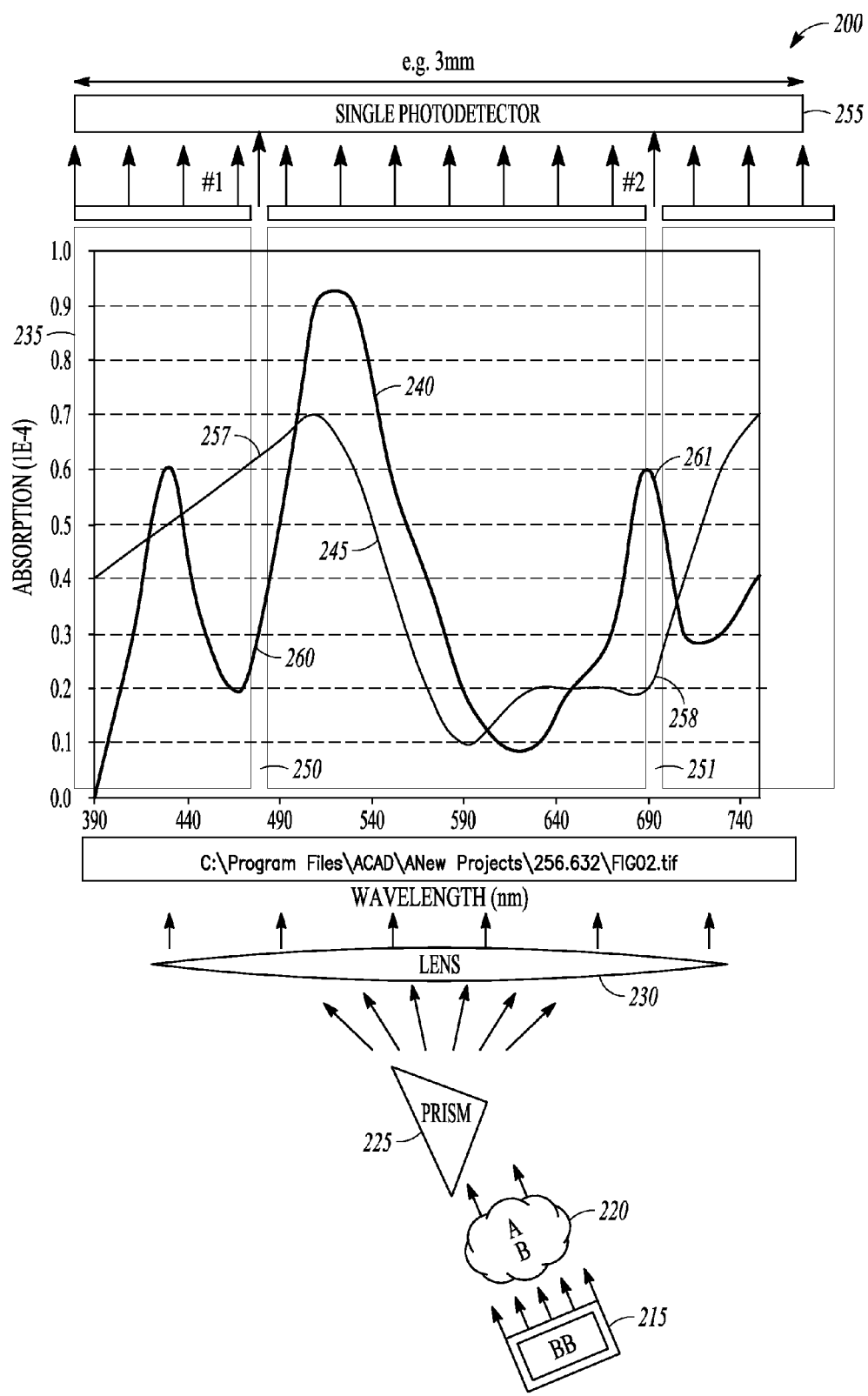
FIG. 2 is a schematic diagram of a two slit coded filter designed to detect a gas according to an example embodiment.
Figure 6:
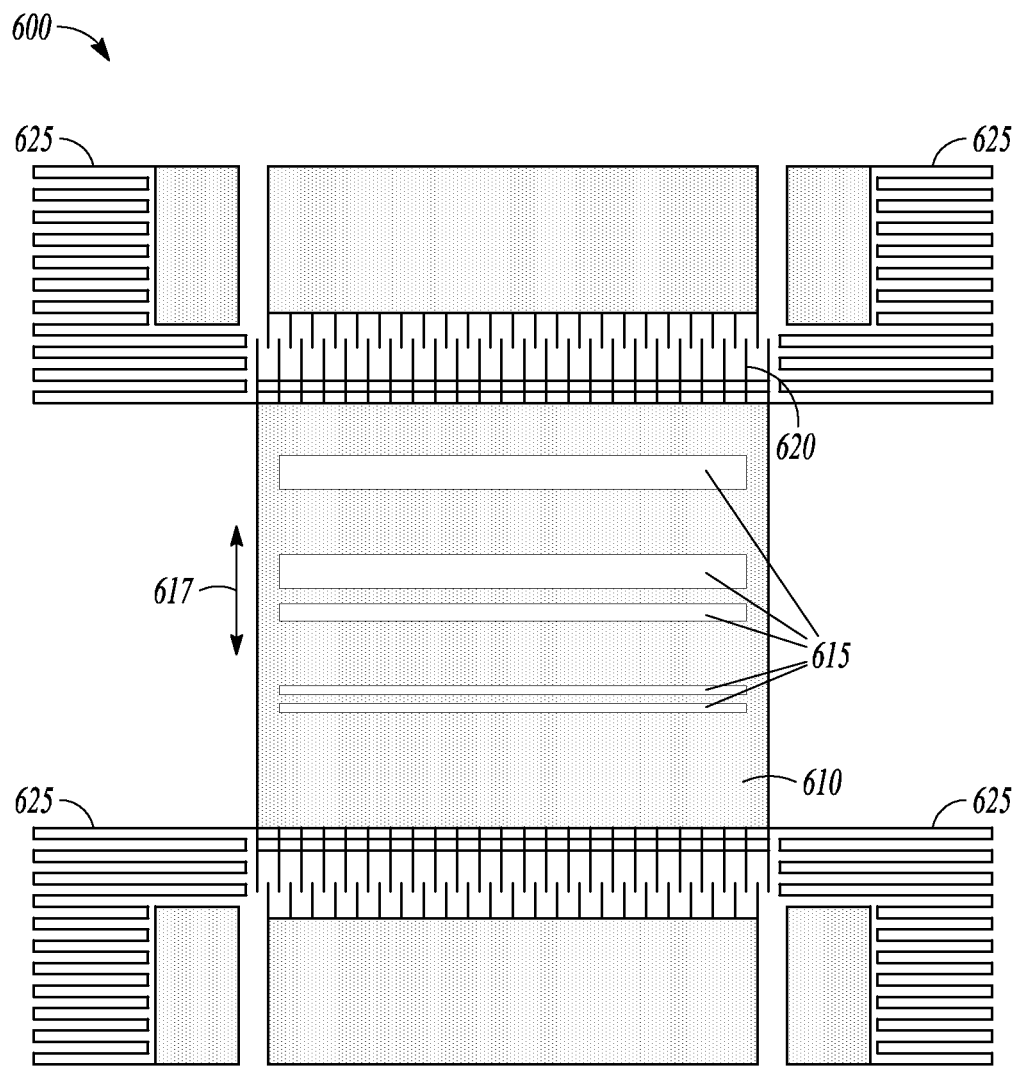
FIG. 6 is a top view representation of a coded filter as part of a microelectromechanical oscillator according to an example embodiment.
Figure 7:
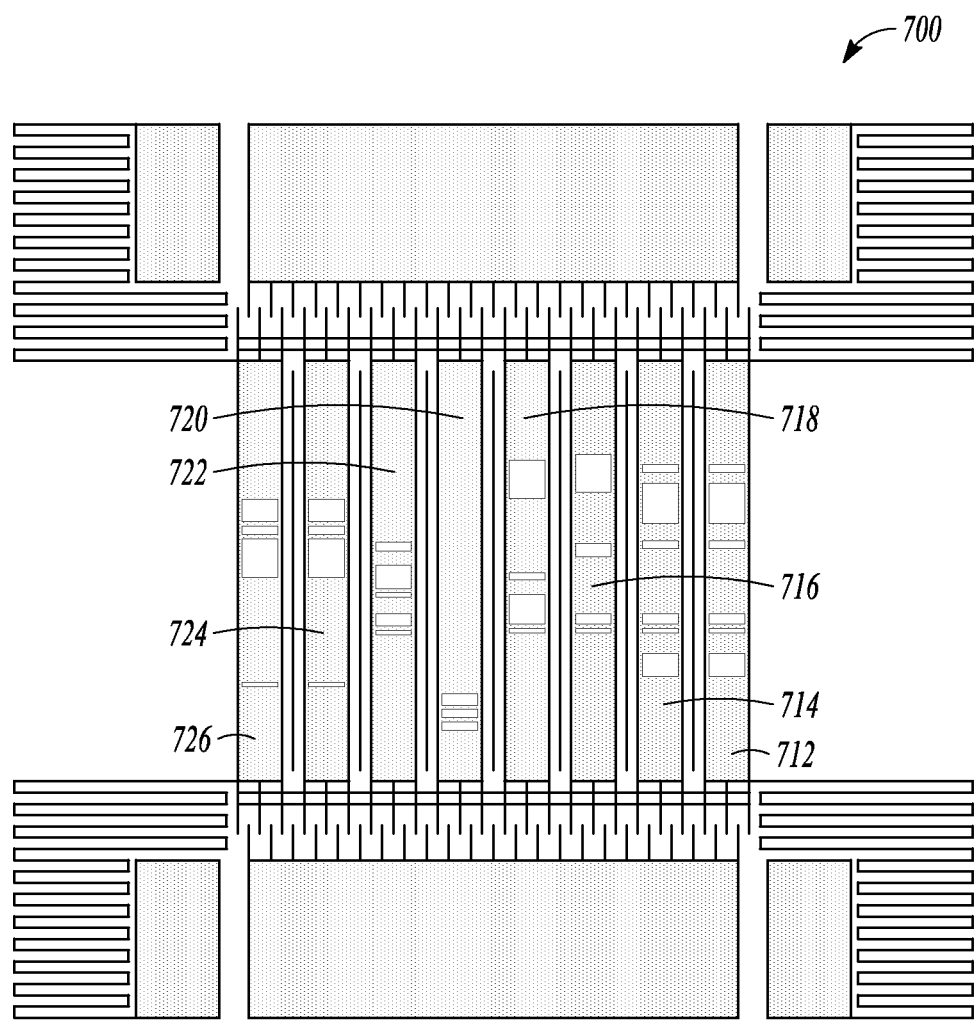
FIG. 7 is a schematic view of a multiple lane filter according to an example embodiment.

FIG. 2 is a schematic diagram of a two slit coded filter generally at 200. A light source is indicated at 215 that emits light toward a plume 220 of two gases, A and B. Light that is transmitted through the plume is spectrally separated by an optical elements 225, and collimated via a lens 230. A coded filter is represented at 235, which also illustrates the light absorbed from gases A and B at 240 and 245 respectively. In one embodiment, the filter reduces the total amount of light reaching a photo detector 255 by approximately 10×. Absorption is indicated on a vertical axis with numbers corresponding to absorption at $10^{-4}$, and the wavelength of the light is indicated on the horizontal axis in nanometers.

Two slits in the coded filter are indicated at 250 and 251 respectively. The slits are not necessarily to scale. Slit 250 is positioned to move about a portion of the spectra corresponding to gas 245 indicated at 257, and slit 251 is positioned about a portion of the spectra corresponding to gas 245 indicated at 258. The coded filter is then oscillated transverse to the spectra a selected distance, left and right as shown, about those portions of the spectra. Typical frequencies of oscillation are between 5 and 10 kHz, but may vary significantly in further embodiments. The oscillation of the coded filter results in the total amount of light reaching the photo detector being modulated at the oscillation frequency f0. Note that both of the gas 245 spectra are increasing, resulting in AC signals from gas 245 that add. The signal scales linearly with the amount of gas 240. This signal will be detected by the photo detector 255, and passed on to the controller.

The same two slits 250 and 251 with respect to gas 245 correspond to portions 260 and 261 of the gas 240 spectra. Note that while the spectra is increasing at 260, it is decreasing at 261. The light passed by slits 250 and 251 from gas 240 counter each other. The resulting signals from these two areas of the gas 240 spectra effectively cancel each other out, resulting in a net zero AC signal reaching the photo detector 255.

When a system is manufactured perfectly such that there are no deviations from a nominally designed structure, constant weighing of the sensed, signal at $\omega_0$ may be used. This results in all parts of the motion of the coded filter being weighted equally.

When the coded filter is not positioned perfectly within the system, such that the slits are slightly shifted in the spectrum, the resulting signal may be shifted toward red or blue. In such a case, the controller 160 may add a $\sin(\omega_0)$ component as illustrated generally at 300 in FIG. 3 to the weighting function to compensate for red-blue packaging alignment errors. This changing of the phase of the first harmonic provides the ability to compensate for up to 15 um a mis-alignment with ~1 nm equivalent physical precision and resolution in one embodiment. These lengths may vary in further embodiments depending on where the relative sizes and spacing of the system components. At 310, the red portion of the signal is weighted more, whereas at 315, the blue portion of the signal is weighted more.

A slit width error or deviation from nominal may be addressed by adding a $\sin(3\omega_0)$ term to the weighting function to compensate for photo-and-etch linewidth errors. This weighting of the third harmonic as illustrated at 400 in FIG. 4 provides the ability to compensate for 1 um sizing error with ~1 nm equivalent physical precision and resolution. Again, these sizes are system size dependent and may vary in different embodiments. Weighting the third harmonic provides the ability to weight edges of the signal more as indicated at 410, or to weight the center of the signal more as indicated at 415.

In general, different species of gas, such as species A and species B respond similarly to red-blue shifts and to slit widening. The compensation for the differences described above may not sufficiently distinguish the species. When designing the coded filter, it is the designer's responsibility to position the slits so that spectra of species A, add spectra of species B have different radii of curvature ($2^{nd}$ derivatives) at at least one slit. The controller 160 adds a $k_2 \sin(2\omega_0)$ component to the weighting function to enable exploitation of the different radii of curvature.

An additional difficulty may arise when the photodetector is not as sensitive to red light as it is to blue light, or vice versa. Further, the light source may not be a black body emitter, and thus may emit differing amounts of red and blue light. These difficulties may be addressed by adjusting the slit widths a-priori to deal with known non-flatness in detector sensitivity and source emissivity.

Even after adding in harmonics as described above, orthoganalization against all interferrants may not be sufficient. In one embodiment, the controller is adapted to add higher harmonic $k_n \sin(n\omega_0)$ terms to the weighting function as needed to deal with variabilities in the absorption spectra in the different chemicals.

The Absorption function $A_{CS}$ for the $C^{th}$ chemical and the $s^{th}$ slit can be expressed as its Taylor function expansion around the mid-point of the slit: $A_{CS}=a_{0cs}+a_{1cs}x(t)+a_{2cs}x^2(t)+a_{3cs}x^3(t)+a_{4cs}x^4(t)+a_{5cs}x^5(t)+a_{6cs}x^6(t)+a_{7cs}x^7(t)$. Here, x(t) =Amplitude*$\sin(\omega_0 t)$. The weighting function W can be expressed as $W=k_0+k_1 \sin(\omega_0 t)+k_2 \sin(2\omega_0 t)+k_3 \sin(3\omega_0 t)+k_4 \sin(4\omega^0 t)+k_5 \sin(5\omega_0 t)+k_6 \sin(6\omega_0 t)+k_7 \sin(7\omega_0 t)$, or as indicated at 500 in FIG. 5. Because $\int \sin(n\omega_0 t) \sin(m\omega_0 t)=0$ sinless m=n, very few terms in the product survive.

Because of Gaussian smear, the contributions of the sin $(n\omega_0)$ terms diminish rapidly as n increases. The Weighting function brings tremendous flexibility in provide orthogonality, despite processing and packaging variabilities.

FIG. 6 is a top view representation of a coded filter 600 as part of a microelectromechanical oscillator. The filter 600 includes a proof mass 610 that contains multiple slits indicated at 615. The proof mass includes interdigitated electromagnetic drive fingers 620 to provide force to cause oscillation of the proof mass 610 in a direction illustrated at 617, transverse to the spectra to be detected. The proof mass 610 is supported by springs 625. The mass of the proof mass in conjunction with a spring constant of the springs 625 help define a resonant frequency of the proof mass. In various embodiments, the oscillator has a resonant frequency between 50 to 10000 Hertz. In further embodiments, the resonant frequency may be less than 50 or more than 10000 Hertz.

In further embodiments, the coded filter may be moved by one or more of many different types of mechanisms, including electromagnetic actuators. The speed and frequency of the movement may vary significantly, from less than one hertz to many thousands of hertz or higher, provided resulting AC signals can be detected and processed.

FIG. 7 illustrates a multiple lane coded filter 700 designed for detection of Sarin gas in air. There are eight lanes illustrated at 712, 714, 716, 718, 720, 722, 724, and 726. Each lane has a corresponding photo detector located beneath it, and represented by the same reference number, but not visible in this view. The lanes are formed in a proof mass of a microelectromechanical oscillator as previously described. Filter 700 is designed knowing in advance the spectra of all of the gas species likely to be present. In one embodiment, the gas is Sarin, but may also be GB, GD, and other undesirable gases that are crucial to detect prior to being exposed to humans. Gases that the filter is designed to not respond to include $H_2O$, $CO_2$, $O_3$, $CH_4$, and others.

Figure 8:
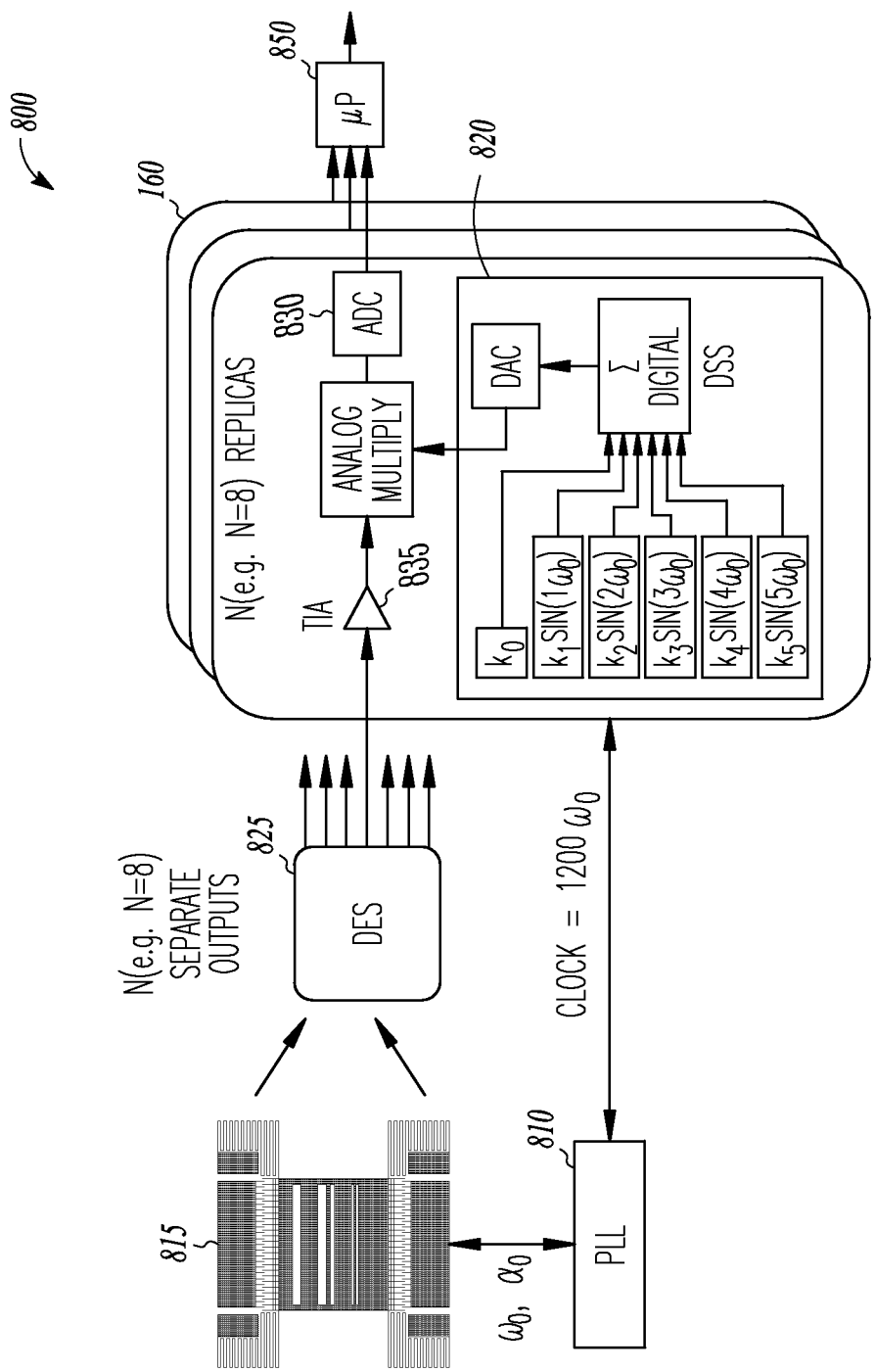
FIG. 8 is a block circuit diagram illustrating use of weighted harmonics to process signals representative of multiple gases according to an example embodiment.

The controller 160 may also be used to drive the oscillator in some embodiments. In a block circuit diagram illustrated at 800 in FIG. 8, a PLL (Phase Locked Loop) 810 may be used to drive a comb oscillator 815 at its resonant frequency. In some embodiments, the resonant frequency determines $\omega_0$. A value $\alpha_0$ may be selected to set the overall physical amplitude of the comb driven coded filters. $\omega_0$ is used as the clock frequency for a DDS 820 (Direct Digital Synthesizer), detection electronics 825, and an analog to digital converter 830 in the controller 160, which has replicas to equal the number of coded filters in the comb oscillator, eight, in this embodiment.

In circuit 800, calibration coefficients $k_0$-$k_5$ may be selected to weight the various harmonics components of the detection circuit. This enables a high degree of orthogonalization of the signal-of-interest to each spectral interferrant. The output signal from the DES 825 system is amplified using a high-gain TIA 835 (Trans-Impedance Amp). The amplified output signal is differentially compared it to the DDS 820 waveform using an adder. The result is converted to digital at 830, and output the signal is provided to a microprocessor 850 or other computing device for identifying one or more gases. The control circuit used to drive the coded filter at resonance is similar to the circuit used in high-precision MEMS gyros in one embodiment. A coherent source and post-detection signal processing may be used. Signals and noise levels in the pico-Watt range may be handled. In one embodiment, integration is performed until the S/N>>1.

Figure 9:
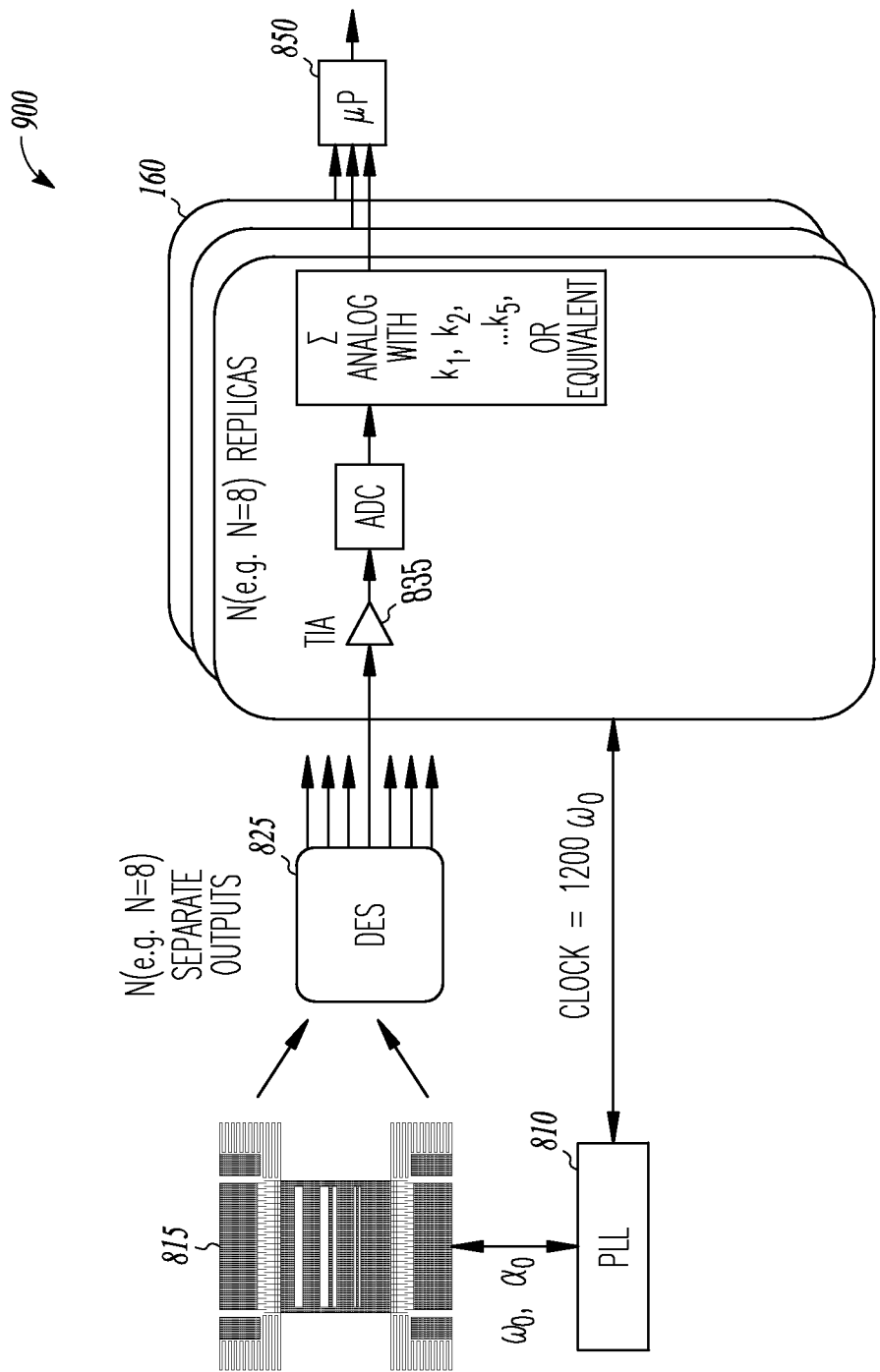
FIG. 9 is an alternative block circuit diagram illustrating use of weighted harmonics to process signals representative of multiple gases according to an example embodiment.

An alternative circuit 900 is illustrated in block form in FIG. 9. In this embodiment, the raw data from the DES is processed digitally. Jitter may be added to compensate LSB errors. Circuit 900 has more flexibility in dealing with the amplitude of the data, but may have less precision in dealing with timing (spectral resolution) of the data.

While modeling may be used to calibrate each system, in further embodiments, individual test and calibration of each system will be performed. The physical amplitude of the oscillation of the coded filter may first be adjusted to null the primary interferrent. In one embodiment, a typical amplitude=$k_0$~10-20 um total motion. The physical amplitude may be controllable to within 1 nm=1E-4.

Next, the comb resonator is driven at $\omega_0$, and the signal at $\omega_0$ is sensed and appropriately weighted higher harmonics are calculated. The 2 $\omega_0$ component may be added to compensate for red-blue packaging alignment errors. The 3 $\omega_0$ component may be added to compensate for photo-and-etch linewidth errors. The 4 $\omega_0$ component may be added to compensate for wide slits behaving differently with finite amplitude oscillations than narrow slits. Finally, the 5 $\omega_0$ components may be added as a "knob to turn" to deal with assorted non-linearities and unanticipated non-Eigen components in the spectra.

The above additions and adjustment may be repeated with test samples of each of the interferrents of interest until optimal orthogonality is achieved.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. An apparatus for detecting gas concentrations, the apparatus comprising:
   a coded filter to oscillate at a selected frequency;
   a photo detector positioned below the coded filter such that the coded filter selectively blocks light that is directed at the photo detector;
   optics for projecting spectral information on to the coded filter; and
   a processor for analyzing a signal received from the photo detector, wherein the processor
   is adapted to weight harmonics of the signal, wherein the slits are positioned to pass at least two AC components of the spectrally separated light corresponding to a gas not of interest such that the AC components cancel out on the photo detector.

2. The device of claim 1 wherein the coded filter comprises an opaque plane having slits, the coded filter to be oscillated at a coded filter resonant frequency $\omega_0$, and wherein shifted coded filter slits are compensated for by the processor adding a first harmonic, $\sin(\omega_0)$ component.

3. The device of claim 2 wherein the slits are positioned on the opaque plane to pass at least one AC component of the spectrally separated light corresponding to the selected gas.

4. The device of claim 1 wherein the coded filter comprises an opaque plane having slits, the coded filter to be oscillated at a coded filter resonant frequency $\omega_0$, and wherein slit width deviations from nominal are compensated for by the processor adding a third harmonic, $\sin(3\omega_0)$ component.

5. The device of claim 1 wherein the coded filter comprises an opaque plane having slits, the coded filter to be oscillated at a coded filter resonant frequency $\omega_0$, and wherein a combination of shifted code filter slits and slit width deviations from nominal are compensated for by the processor adding first, second, and third harmonic components.

6. The device of claim 1 wherein the processor adds higher harmonic $k_n \sin(n\omega_0)$ terms to the weighting function to compensate for variabilities in absorption spectra, where $\omega_0$ is the resonant frequency of the coded filter, n is a value identifying the harmonic, and $k_n$, is a weighting constant for the $n^{th}$ harmonic.

7. The device of claim 1 and further comprising:
   a phase locked loop to drive the coded filter at its resonant frequency; and
   an adder to add higher order harmonics to the signal received from the photo detector.

8. A device for detecting gas concentrations comprising:
   a movable coded filter having multiple slits in a proof mass;
   an optical element positioned to receive gas filtered light and spectrally separate the gas filtered light onto the coded filter wherein spectral bands run in the same direction as the slits, the slits positioned to cancel AC signals corresponding to at least one gas not of interest;
   a photo detector positioned to receive the spectrally separated light through the oscillating slits in the moveable coded filter to provide an AC signal representative of a selected gas; and
   a controller coupled to receive the AC signal, convert the AC signal to a digital signal, to weight a harmonic of the received AC signal, and to correlate an amplitude of the AC signal with the weighted harmonic to a concentration of the selected gas.

9. The device of claim 8 wherein the coded filter comprises an opaque plane having slits, the coded filter to be oscillated at a coded filter resonant frequency $\omega_o$, and wherein shifted coded filter slits are compensated for by the controller adding a first harmonic, $\sin(\omega_0)$ component.

10. The device of claim 9 wherein the slits are positioned on the opaque plane to pass at least two AC components of the spectrally separated light corresponding to a gas not of interest such that the AC components cancel out on the photo detector.

11. The device of claim 8 wherein the coded filter comprises an opaque plane having slits, the coded filter to be oscillated at a coded filter resonant frequency $\omega_0$, and wherein slit width deviations from nominal are compensated for by the controller adding a third harmonic, $\sin(3\omega_0)$ component.

12. The device of claim 8 wherein the coded filter comprises an opaque plane having slits, the coded filter to be oscillated at a coded filter resonant frequency $\omega_0$, and wherein a combination of shifted code filter slits and slit width deviations from nominal are compensated for by the controller adding first, second, and third harmonic components.

13. The device of claim 8 wherein the controller adds higher harmonic $k_n \sin(n\omega_0)$ terms to the weighting function to compensate for variabilities in absorption spectra, where $\omega_0$ is the resonant frequency of the coded filter, n is a value identifying the harmonic, and $k_n$ is a weighting constant for the $n^{th}$ harmonic.

14. The device of claim 8 and further comprising:
a phase locked loop to drive the coded filter at its resonant frequency; and
an adder to add higher order harmonics to the signal received from the photo detector.

15. A method for detecting a gas, the method comprising:
receiving light from a light source through a plume of gas;
spectrally separating the light;
oscillating a coded filter to selectively pass portions of the spectrally separated light onto a single photo detector;
detecting an AC signal via the single photo detector representative of a gas of interest;
weighting a harmonic of the AC signal; and
combining the AC signal with the weighted harmonic of the AC signal to detect the gas, wherein the coded filter is configured to pass at least two AC components of the spectrally separated light corresponding to a gas not of interest such that the AC components cancel out on the photo detector.

16. The method of claim 15 wherein a first harmonic, $\sin(\omega_o)$ component is combined with the AC signal, where $\omega_0$ is the resonant frequency of the coded filter.

17. The method of claim 15 wherein a third harmonic, $\sin(3\omega_0)$ is combined with the AC signal, where $\omega_0$ is the resonant frequency of the coded filter.

18. The method of claim 15 wherein first, second, and third harmonic components are combined with the AC signal.

19. The method of claim 15 wherein higher harmonic $k_n \sin(n\omega_0)$ terms are combined with the AC signal to compensate for variabilities in absorption spectra, where $\omega_0$ is the resonant frequency of the coded filter, n is a value identifying the harmonic, and $k_n$ is a weighting constant for the $n^{th}$ harmonic.

* * * * *